United States Patent
Abe et al.

(10) Patent No.: US 10,073,309 B2
(45) Date of Patent: Sep. 11, 2018

(54) LIQUID CRYSTAL DISPLAY DEVICE

(71) Applicants: Panasonic Liquid Crystal Display Co., Ltd., Hyogo (JP); Panasonic Corporation, Osaka (JP)

(72) Inventors: Tsutomu Abe, Kanagawa (JP); Naotoshi Sumiya, Chiba (JP); Akira Ishikawa, Nara (JP); Yoshiki Nakano, Hyogo (JP); Tsutomu Arihara, Kanagawa (JP); Masami Yoda, Kanagawa (JP)

(73) Assignees: PANASONIC LIQUID CRYSTAL DISPLAY CO., LTD., Hyogo (JP); PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/589,118

(22) Filed: May 8, 2017

(65) Prior Publication Data

US 2017/0343848 A1  Nov. 30, 2017

(30) Foreign Application Priority Data

May 31, 2016 (JP) ................................ 2016-108052

(51) Int. Cl.
| | | |
|---|---|---|
| *G02F 1/1345* | (2006.01) | |
| *G02F 1/1343* | (2006.01) | |
| *G02F 1/1335* | (2006.01) | |
| *G02F 1/1339* | (2006.01) | |

(52) U.S. Cl.
CPC ........ *G02F 1/13452* (2013.01); *G02F 1/1339* (2013.01); *G02F 1/133528* (2013.01); *G02F 1/134363* (2013.01); *G02F 2201/121* (2013.01); *G02F 2201/123* (2013.01); *G02F 2201/56* (2013.01); *G02F 2202/28* (2013.01)

(58) Field of Classification Search
CPC ........... G02F 1/134363; G02F 1/13452; G02F 1/13454
See application file for complete search history.

(56) References Cited

U.S. PATENT DOCUMENTS

| | | |
|---|---|---|
| 5,870,160 A | 2/1999 | Yanagawa et al. |
| 6,034,757 A | 3/2000 | Yanagawa et al. |
| 6,108,066 A | 8/2000 | Yanagawa et al. |

(Continued)

FOREIGN PATENT DOCUMENTS

| | | |
|---|---|---|
| JP | 9-105918 | 4/1997 |
| JP | 2009-92884 | 4/2009 |

*Primary Examiner* — Jessica M Merlin
(74) *Attorney, Agent, or Firm* — Wenderoth, Lind & Ponack, L.L.P.

(57) ABSTRACT

A lateral electric field type liquid crystal display device having a curved display surface, comprises: a curved first substrate including a plurality of gate lines, a plurality of data lines, a pixel electrode, and a common electrode; a curved second substrate that is disposed opposite to the first substrate, the second substrate including a polarizing plate; a liquid crystal layer disposed therebetween; a sealing material bonding the first substrate and the second substrate together; and a driver that outputs a drive signal to at least the plurality of gate lines or the plurality of data lines. In the polarizing plate, at least a part of a side near the driver overlaps the sealing material or is disposed outside the sealing material in planar view.

8 Claims, 13 Drawing Sheets

(56) References Cited

U.S. PATENT DOCUMENTS

| | | | | |
|---|---|---|---|---|
| 2011/0227848 | A1* | 9/2011 | Furusawa | G06F 1/1626 |
| | | | | 345/173 |
| 2012/0257151 | A1* | 10/2012 | Teramoto | G02F 1/133512 |
| | | | | 349/106 |
| 2013/0271958 | A1* | 10/2013 | Jang | H05K 7/02 |
| | | | | 362/97.1 |
| 2015/0185565 | A1* | 7/2015 | Park | G02F 1/134363 |
| | | | | 349/43 |

* cited by examiner

FIG.3
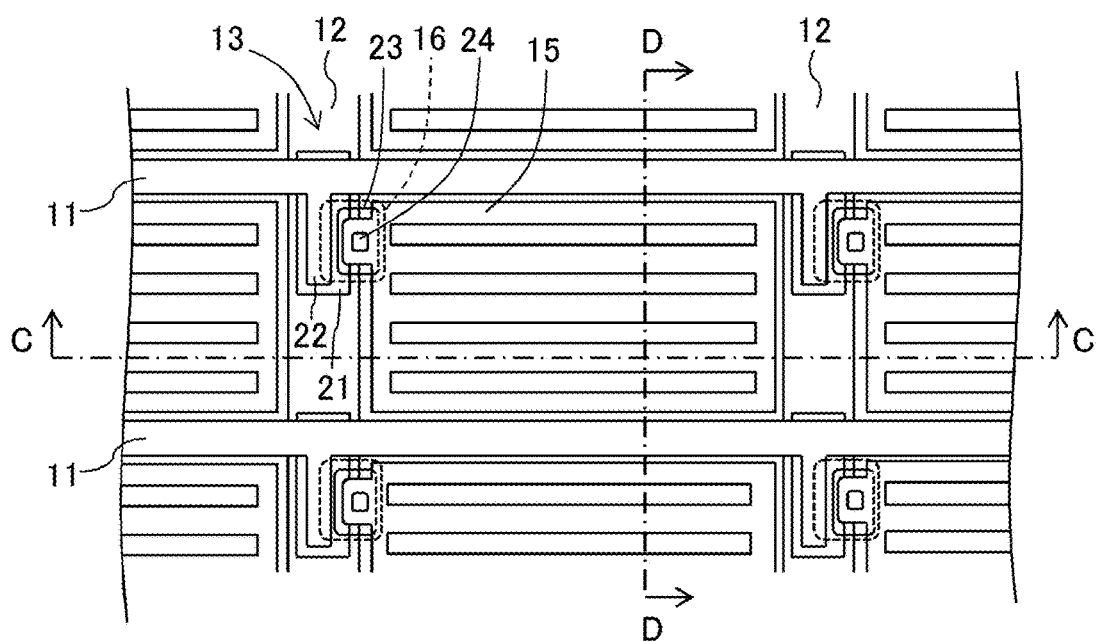
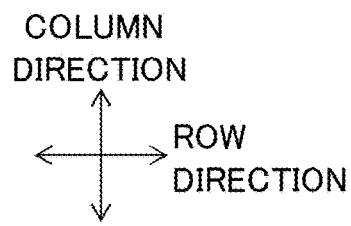

LIQUID CRYSTAL DISPLAY DEVICE

CROSS-REFERENCE TO RELATED APPLICATION

This application claims priority from Japanese application JP 2016-108052, filed May 31, 2016. This Japanese application is incorporated herein by reference.

TECHNICAL FIELD

The present invention relates to a liquid crystal display device.

BACKGROUND

Recently there is proposed a liquid crystal display device having a curved display surface (for example, Unexamined Japanese Patent Publication No. 2009-92884). In such a liquid crystal display device, a pair of substrates (a thin film transistor substrate (TFT substrate) and a color filter substrate (CF substrate)) are formed so as to be curved.

SUMMARY

The inventors have found that luminance unevenness occurs in a vicinity of a corner of a display screen in a lateral electric field type liquid crystal display device typified by an IPS (In-Place-Switching) type liquid crystal display device among liquid crystal display devices having the curved display surfaces. Specifically, in the case where the TFT substrate and the CF substrate are formed in a curved shape such that a rear surface side becomes convex, a tensile (extension) stress acts on a glass substrate constituting the TFT substrate while a compressive stress acts on a glass substrate constituting the CF substrate. A problem does not occur if curvatures of the two glass substrates are ideal (constant), but actually a deviation occurs with respect to the ideal (constant) curvature by reaction to bending. The occurrence of such deviation generates a phase difference between the glass substrates in a direction oblique to liquid crystal molecules. In the lateral electric field type, because the liquid crystal molecules are disposed substantially parallel to the TFT substrate and the CF substrate, oblique light (polarized light) further rotates by an influence of the phase difference. The rotation of the polarized light is not canceled by a polarizing plate, and light leakage occurs. As a result, a white defect is easily visually recognized when a black image is displayed. Because the light leakage easily occurs in the vicinity of the corner where the deviation from the ideal curvature increases, the luminance unevenness easily occurs in the vicinity of the corner of the display screen.

On the other hand, in the conventional liquid crystal display device, from the viewpoint of material cost reduction or electrostatic discharge, the polarizing plate disposed on the CF substrate is generally disposed inside a sealing material, which is used to bond the TFT substrate and the CF substrate together, in planar view. For example, as a configuration for removing static electricity charged on the CF substrate in the lateral electric field type liquid crystal display device, Unexamined Japanese Patent Publication No. H9-105918 discloses a configuration in which a conductive layer is formed on a surface on an opposite side to the liquid crystal layer of the CF substrate, a ground terminal is formed in the TFT substrate, and the conductive layer and the ground terminal are electrically connected using a cable or the like. In the above configuration, in planar view, the polarizing plate disposed on the CF substrate is disposed inside the sealing material, the conductive layer is exposed in surroundings of the polarizing plate, and the cable is connected to the exposed conductive layer.

In the lateral electric field type liquid crystal display device having the curved display surface, when the polarizing plate disposed on the CF substrate is disposed inside the sealing material, a step (clearance) is generated in a peripheral portion of the CF substrate according to a thickness of the polarizing plate, and the peripheral portion of the CF substrate is hardly held by a cover glass, a film, or the like, which is disposed on the display surface side of the CF substrate. Therefore, a distortion increases in the vicinity of the corner in the display panel, and the luminance unevenness is easily visually recognized.

The present disclosure has been made in view of the above circumstances, and an object of the present disclosure is to reduce luminance unevenness occurring in a vicinity of a corner of a display screen in a lateral electric field type liquid crystal display device having a curved display surface.

To solve the above problem, a liquid crystal display device being a lateral electric field type having a curved display surface according to a present disclosure comprises: a first substrate including a plurality of gate lines, a plurality of data lines, a pixel electrode, and a common electrode; a second substrate that is disposed opposite to the first substrate, the second substrate including a polarizing plate; a liquid crystal layer disposed between the first substrate and the second substrate; a sealing material surrounding the liquid crystal layer and used to bond the first substrate and the second substrate together; and a driver that outputs a drive signal to at least the plurality of gate lines or the plurality of data lines, wherein in the polarizing plate, at least a part of a side near the driver overlaps the sealing material or is disposed outside the sealing material in planar view.

In the liquid crystal display device according to the present disclosure, the first substrate may be curved such that a portion of the first substrate located at a center in a first direction protrudes from portions of the first substrate located at both ends in the first direction toward a display surface side or a rear surface side, the second substrate may be curved along the first substrate, the first substrate may include a driver mounting region protruding in the first direction from the second substrate in planar view, and the driver may be mounted in the driver mounting region.

In the liquid crystal display device according to the present disclosure, a ground terminal may be disposed in the driver mounting region, the second substrate further may include a conductive layer disposed in a position closer to the first substrate than the polarizing plate, the liquid crystal display device further may include a connection member that electrically connects the ground terminal to the conductive layer, and a notch may be formed in the side near the driver in the polarizing plate such that a connection region to the connection member in the conductive layer is exposed.

In the liquid crystal display device according to the present disclosure, in planar view, one end of the connection member may overlap the ground terminal, and another end of the connection member may overlap the connection region exposed from the notch formed in the polarizing plate.

In the liquid crystal display device according to the present disclosure, the polarizing plate may include a first side which is provided with the notch and located near the driver, a second side located opposite to the first side, a third side connected to one end of the first side and one end of the second side, and a fourth side connected to another end of the first side and another end of the second side, and in planar view, a portion connected to the notch in the first side, the second side, the third side, and the fourth side may overlap the sealing material, or are located outside the sealing material.

In the liquid crystal display device according to the present disclosure, in the first side, the notch may be formed in a region closer to a central position between both ends connected to the third side or the fourth side than to both the ends.

In the liquid crystal display device according to the present disclosure, a corner of the notch may be formed into an arc shape.

The liquid crystal display device according to the present disclosure may further comprise a front plate disposed on a display surface side of the second substrate, wherein the front plate may be fixedly bonded to the polarizing plate with an adhesive layer interposed therebetween, and the front plate and the adhesive layer may cover a whole of the polarizing plate in planar view.

Owing to the liquid crystal display device according to the present disclosure, a lateral electric field type liquid crystal display device with a curved display surface reducing luminance unevenness occurring in a vicinity of a corner of a display screen, can be obtained.

BRIEF DESCRIPTION OF THE DRAWINGS

FIG. 3 is a plan view illustrating a specific configuration of pixels in the liquid crystal display device;

DETAILED DESCRIPTION

Hereinafter, an exemplary embodiment of the present disclosure will be described with reference to the drawings.

Figure 1:
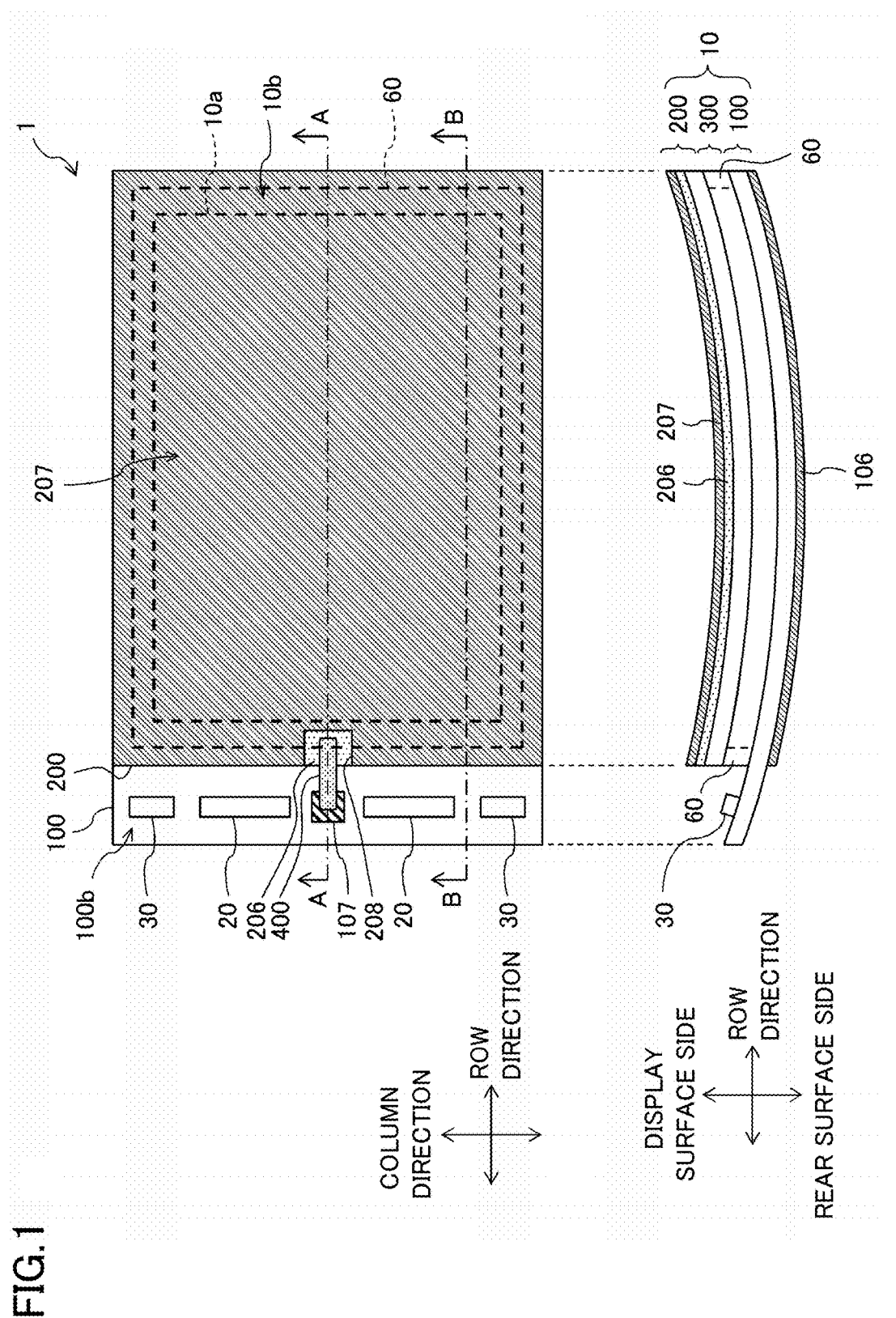
FIG. 1 is a plan view and a side view illustrating a schematic configuration of the liquid crystal display device according to an exemplary embodiment.

FIG. 1 is a plan view and a side view illustrating a schematic configuration of liquid crystal display device 1 according to the exemplary embodiment. Liquid crystal display device 1 includes display panel 10, a driver (for example, source driver IC 20 and gate driver IC 30), a control circuit (not illustrated), and a backlight device (not illustrated). Display panel 10 includes thin film transistor substrate 100 (hereinafter, referred to as a TFT substrate) as a first substrate, color filter substrate 200 (hereinafter, referred to as a CF substrate) as a second substrate, and liquid crystal layer 300 disposed between TFT substrate 100 and CF substrate 200. TFT substrate 100 and CF substrate 200 are fixedly bonded together using sealing material 60 that is formed into a frame shape at a position corresponding to a peripheral portion of CF substrate 200. Liquid crystal layer 300 is disposed while being surrounded by TFT substrate 100, CF substrate 200, and sealing material 60, and liquid crystal included in liquid crystal layer 300 is sealed inside sealing material 60.

As illustrated in FIG. 1, TFT substrate 100 and CF substrate 200 are bent so as to be curved in a row direction that is a first direction. That is, TFT substrate 100 and CF substrate 200 are bent such that a central portion protrudes from both end portions in the first direction toward a display surface side or a rear surface side. In other words, TFT substrate 100 is bent such that a portion of TFT substrate 100 located at a center in the first direction protrudes from portions of TFT substrate 100 located at both ends in the first direction toward a display surface side or a rear surface side, and CF substrate 200 is curved along TFT substrate 100. In the exemplary embodiment, TFT substrate 100 and CF substrate 200 are bent such that the central portion protrudes more to the rear surface side than both the end portions in the first direction.

When display panel 10 is divided into regions, display panel 10 includes display region 10a where the image is displayed and non-display region 10b (frame region) around display region 10a. In TFT substrate 100, a region corresponding to non-display region 10b includes driver mounting region 100b where source driver IC 20 and gate driver IC 30, which are the drivers, are mounted. In liquid crystal display device 1 according to the exemplary embodiment, driver mounting region 100b is disposed on one side (in FIG. 1, a left side) of display panel 10 in order to achieve a narrowed frame. In other words, driver mounting region 100b protrudes from CF substrate 200 in the row direction (first direction) in planar view. TFT substrate 100 has an area larger than CF substrate 200 by driver mounting region 100b in a planar view. In driver mounting region 100b, source driver IC 20 and gate driver IC 30 are directly mounted on a glass substrate constituting TFT substrate 100. That is, FIG. 1 illustrates a COG (Chip On Glass) type liquid crystal display device. source driver IC 20 and gate driver IC 30 are disposed in a line (in FIG. 1, a column direction) along one side of display panel 10. In the exemplary embodiment, two source driver ICs 20 and two gate driver ICs 30 are illustrated. However, there is no limitation to the number of source driver ICs 20 or gate driver ICs 30. The liquid crystal display device according to the exemplary embodiment is not limited to the COG type. For example, a COF (Chip On Film) type or TCP (Tape Carrier Package) type liquid crystal display device may be used.

Ground terminal 107 is disposed in driver mounting region 100b of TFT substrate 100. Ground terminal 107 is disposed in a vicinity of a center in the column direction of driver mounting region 100b. For example, ground terminal 107 is disposed between two source driver ICs 20 in FIG. 1. There is no limitation to the number of ground terminals 107.

Polarizing plate 106 is formed on a rear surface side of TFT substrate 100, and the backlight device is further disposed on the rear surface side of polarizing plate 106. Conductive layer 206 is formed on the display surface side of CF substrate 200, and polarizing plate 207 is formed on the display surface side of conductive layer 206. For example, conductive layer 206 is made of a transparent conductive material ITO (Indium Tin Oxide). Conductive layer 206 is formed in a solid state over a whole surface of CF substrate 200. Polarizing plate 207 is substantially formed in a solid state over a whole surface of conductive layer 206. Notch 208 is formed in one side (in FIG. 1, a left side) of polarizing plate 207. Therefore, conductive layer 206 is exposed from the region of notch 208 when display panel 10 is planarly viewed (see FIG. 1). Connection member 400 is also formed in display panel 10 in order to electrically connect a part (exposed portion) of conductive layer 206 and ground terminal 107 to each other, the part of conductive layer 206 being exposed from polarizing plate 207, and ground terminal 107 being disposed on TFT substrate 100. For example, connection member 400 is formed by applying a conductive material so as to cover the part of ground terminal 107 and the exposed portion of conductive layer 206. Connection member 400 may be a conductive tape or a conductive wiring. Specific configurations of polarizing plate 207 and notch 208 will be described later.

In FIG. 1, an inner periphery of sealing material 60 is illustrated by a dotted line. In planar view, a position in an outer periphery of sealing material 60 coincides with a position in a peripheral portion of CF substrate 200, and a position in the inner periphery of sealing material 60 is positioned outside display region 10a.

Figure 2:
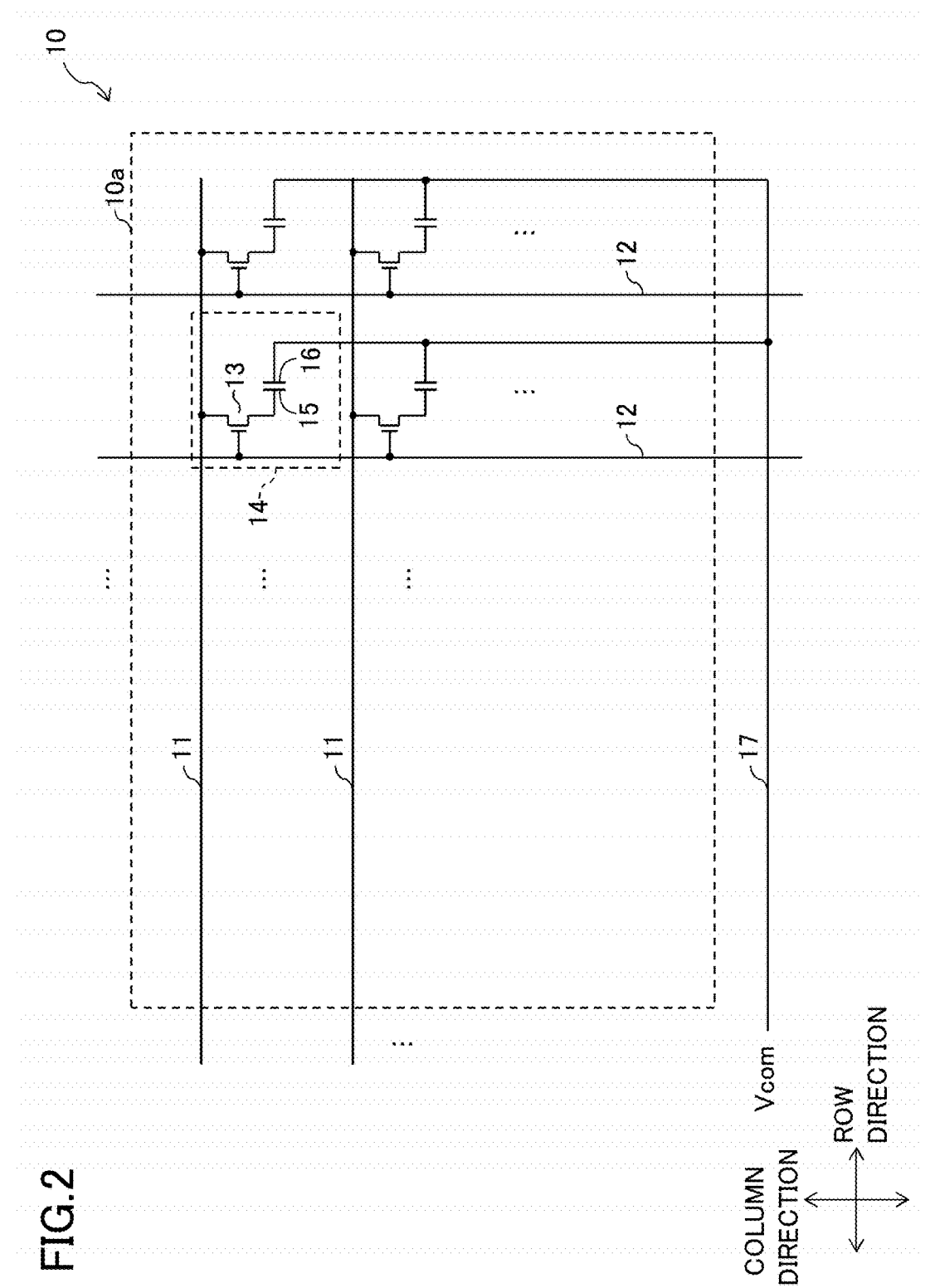
FIG. 2 is an equivalent circuit diagram illustrating a schematic configuration of display region in the liquid crystal display device according to an exemplary embodiment.

FIG. 2 is an equivalent circuit diagram illustrating a schematic configuration of display region 10a in display panel 10. A plurality of data lines 11 extending in the first direction (for example, the row direction) and a plurality of gate lines 12 extending in the second direction (for example, the column direction) are provided in display panel 10. Thin film transistor (hereinafter, referred to as a TFT) 13 is provided in an intersection of each data line 11 and each gate line 12. Each data line 11 is electrically connected to corresponding source driver IC 20 (see FIG. 1), and each gate line 12 is electrically connected to corresponding gate driver IC 30 (see FIG. 1).

In display panel 10, a plurality of pixels 14 are arranged in a matrix form (in the row and column directions) in correspondence with intersections of data lines 11 and gate lines 12. A plurality of pixel electrodes 15 each of which is disposed in a pixel 14 and common electrode 16 shared by the plurality of pixels 14 are provided in TFT substrate 100.

A data signal (data voltage) is supplied to each data line 11 from corresponding source driver IC 20. A gate signal (gate-on voltage and gate-off voltage) is supplied to each gate line 12 from corresponding gate driver IC 30. Common voltage Vcom is supplied from a common driver (not illustrated) to common electrode 16 through common wiring 17. When an on voltage (gate-on voltage) of the gate signal is supplied to gate line 12, TFT 13 connected to gate line 12 is turned on to supply the data voltage to pixel electrode 15 through data line 11 connected to TFT 13. An electric field is generated by a difference between the data voltage supplied to pixel electrode 15 and the common voltage Vcom supplied to common electrode 16. The liquid crystal is driven by the electric field to control transmittance of the light transmitted from the backlight, thereby displaying the image. Desired data voltages are supplied to data lines 11 connected to pixel electrodes 15 of pixels 14, which are formed by striped color filters to correspond to red, green, and blue, thereby performing color display.

Figure 4:
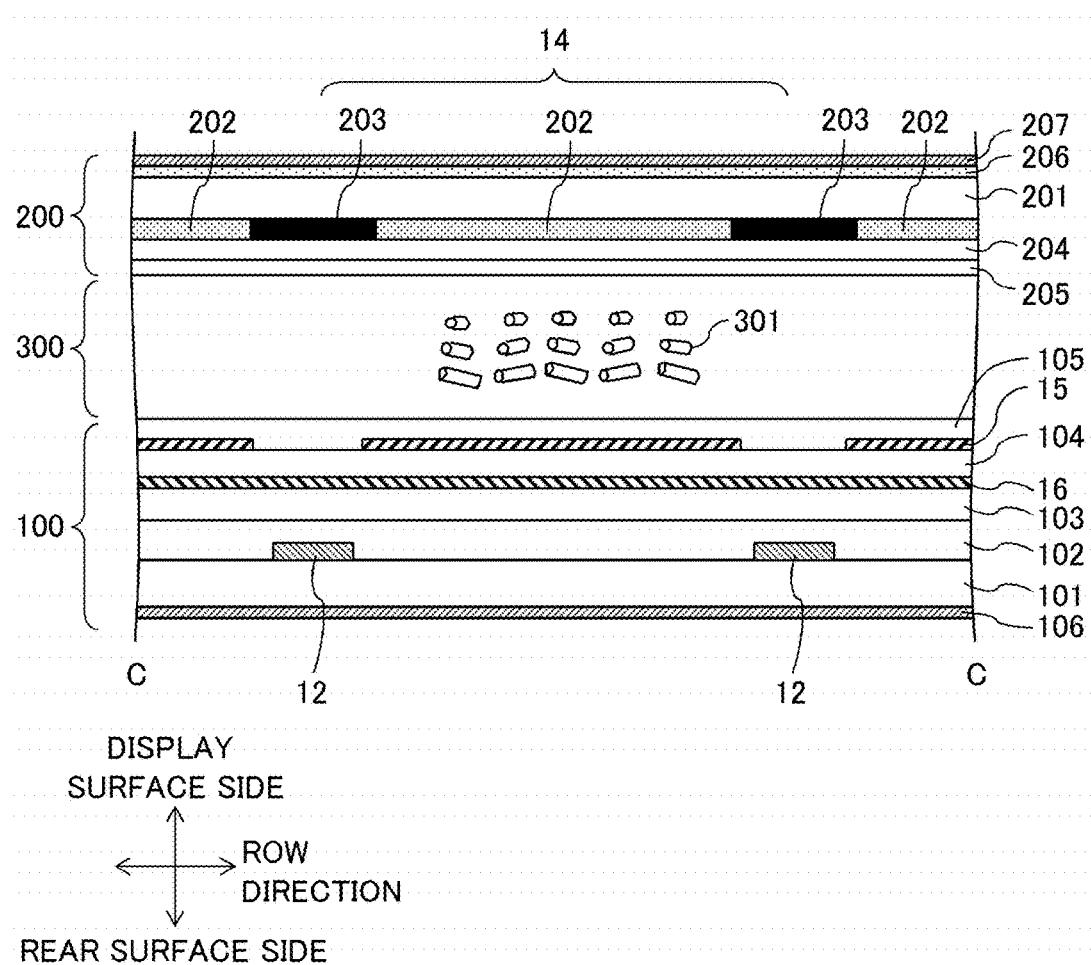
FIG. 4 is a sectional view taken along line C-C in FIG. 3.
Figure 5:
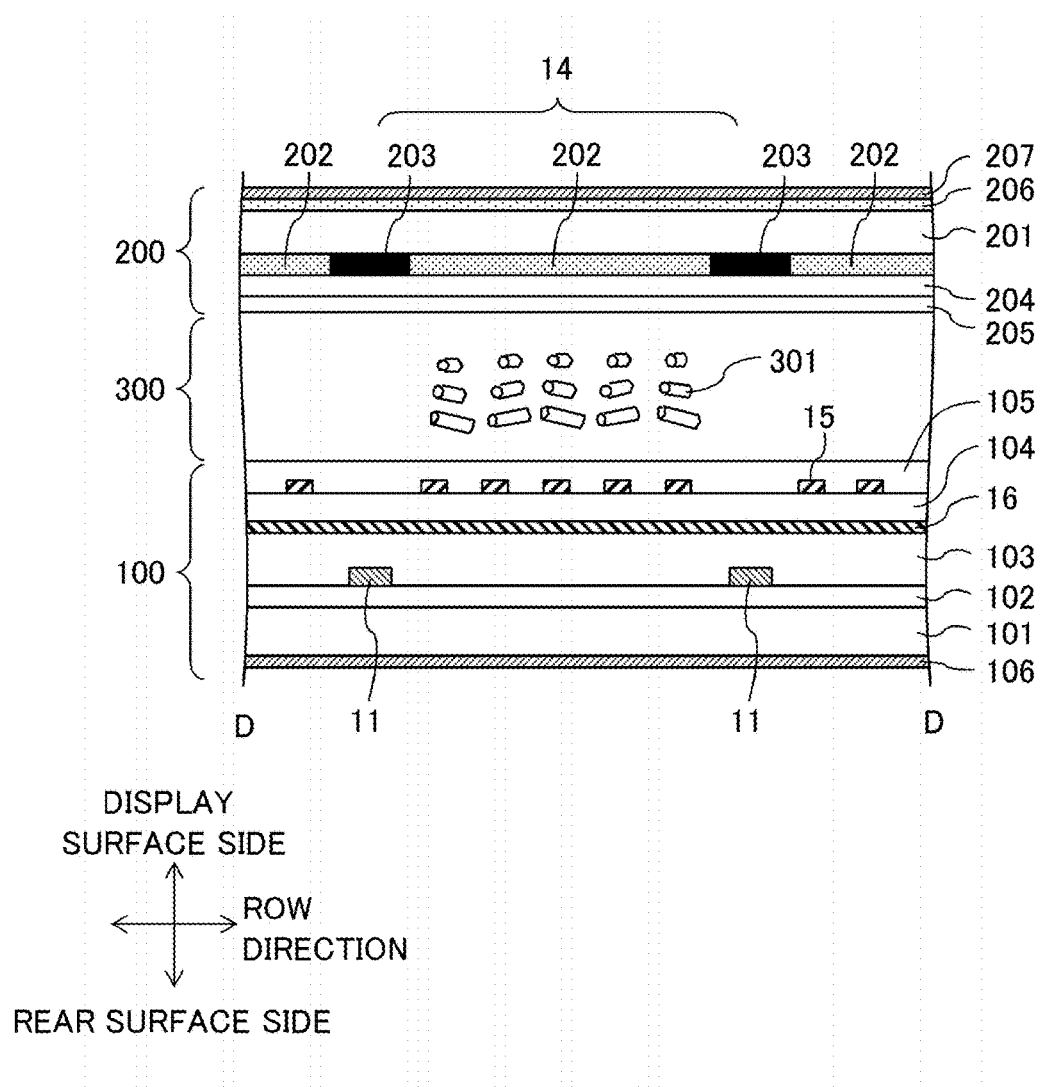
FIG. 5 is a sectional view taken along line D-D in FIG. 3.

FIG. 3 is a plan view illustrating a specific configuration of pixel 14 of display panel 10. FIG. 4 is a sectional view taken along line C-C' in FIG. 3, and FIG. 5 is a sectional view taken along line D-D' in FIG. 3. A specific configuration of pixel 14 will be described below with reference to FIGS. 3 to 5.

Referring to FIG. 3, a region partitioned by two adjacent data lines 11 and two adjacent gate lines 12 corresponds to one pixel 14 when display panel 10 is planarly viewed. TFT 13 is provided in each pixel 14. TFT 13 includes semiconductor layer 21 formed on insulator 102 (see FIGS. 4 and 5) and drain electrode 22 and source electrode 23, which are formed on semiconductor layer 21. Drain electrode 22 is electrically connected to data line 11, and source electrode 23 is electrically connected to pixel electrode 15 via through-hole 24.

Pixel electrode 15 made of a transparent conductive material such as ITO is formed in each pixel 14. Pixel electrode 15 includes a plurality of openings (slit), and is formed into a stripe shape. There is no limitation to a shape of an opening. In each pixel 14, one common electrode 16 made of a transparent conductive material such as ITO is formed over whole display region 10a. An opening (corresponding to a dotted-line box in FIG. 3) is formed to electrically connect pixel electrode 15 and source electrode 23 in a region of common electrode 16, the region overlapping through-hole 24 and source electrode 23 of TFT 13.

As illustrated in FIGS. 4 and 5, display panel 10 includes TFT substrate 100, CF substrate 200, and liquid crystal layer 300 sandwiched between TFT substrate 100 and CF substrate 200.

In TFT substrate 100, gate line 12 (see FIG. 4) is formed on glass substrate 101, and insulator 102 is formed so as to cover gate line 12. Data line 11 (see FIG. 5) is formed on insulator 102, and insulator 103 is formed so as to cover data line 11. Common electrode 16 is formed on insulator 103, and insulator 104 is formed so as to cover common electrode 16. Pixel electrode 15 is formed on insulator 104, and alignment film 105 is formed so as to cover pixel electrode 15. In glass substrate 101, polarizing plate 106 is provided on a surface (rear surface) on the backlight device side (an opposite side to liquid crystal layer 300).

In CF substrate 200, black matrix 203 and colored portion 202 (for example, a red portion, a green portion, and a blue portion) are formed on glass substrate 201, and overcoat layer 204 is formed so as to cover black matrix 203 and colored portion 202. Alignment film 205 is formed on overcoat layer 204. In glass substrate 201, conductive layer 206 is provided on a surface (front surface) on the display surface side (the opposite side to liquid crystal layer 300). In conductive layer 206, polarizing plate 207 is provided on a surface (front surface) on the display surface side (the opposite side to liquid crystal layer 300).

Liquid crystal 301 is sealed in liquid crystal layer 300. Liquid crystal 301 may be a negative liquid crystal having a negative dielectric anisotropy or a positive liquid crystal having a positive dielectric anisotropy. Alignment film 105, 205 may be an alignment film subjected to a rubbing alignment process or a light alignment film subjected to a light alignment process.

As described above, liquid crystal display device 1 has a configuration of the lateral electric field type in which an electric field substantially parallel to TFT substrate 100 and CF substrate 200 is applied to liquid crystal layer 300. For example, liquid crystal display device 1 has a configuration of an IPS (In-Plane Switching) type.

In lateral electric field type liquid crystal display device 1 according to the exemplary embodiment having the curved display surface, polarizing plate 207 disposed on CF substrate 200 has a characteristic configuration, which allows the reduction of the luminance unevenness occurring in the vicinity of the corner of the display screen. Specific configurations of polarizing plate 207 and notch 208 formed in polarizing plate 207 will be described below.

Figure 6:
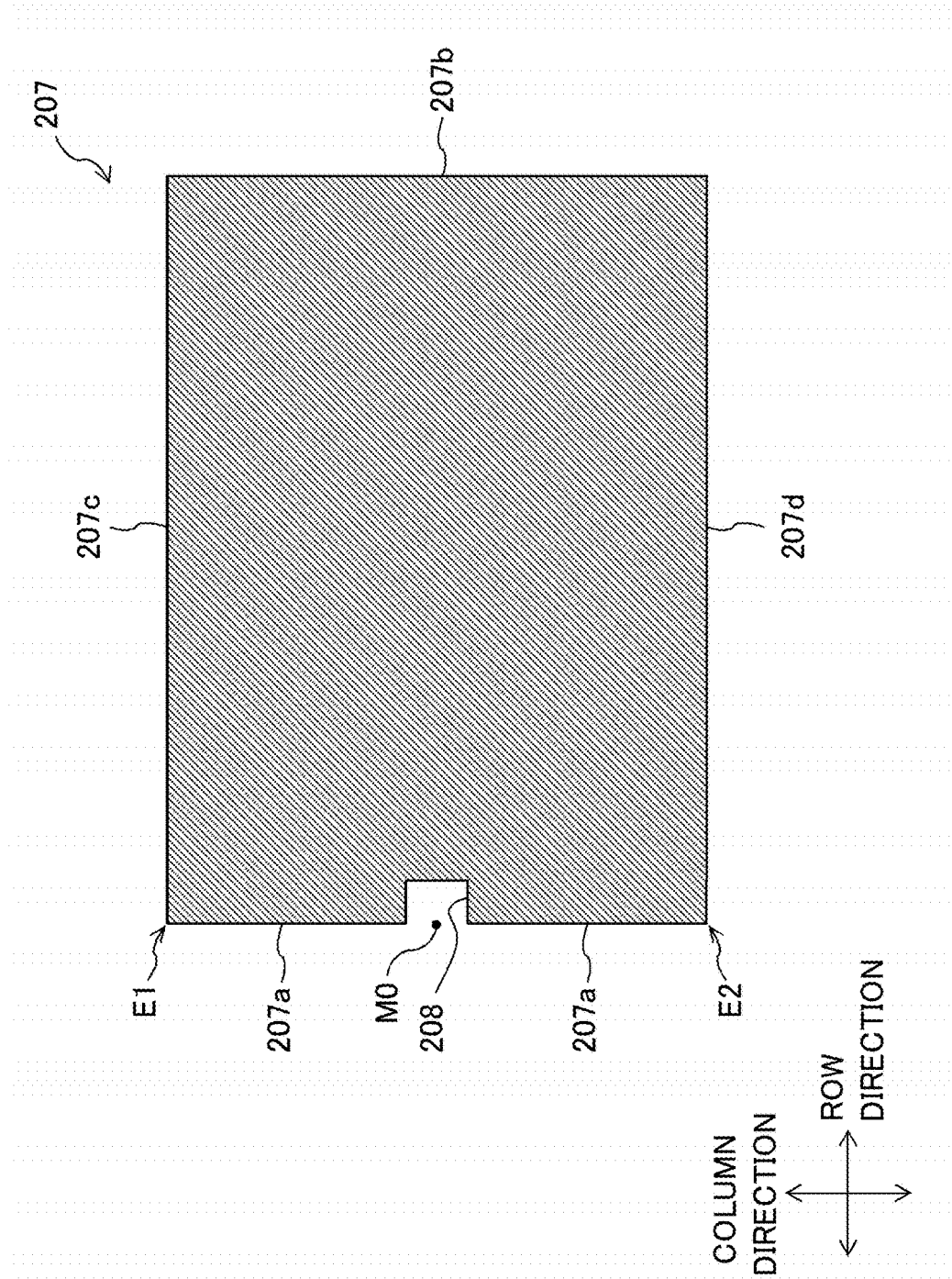
FIG. 6 is a plan view illustrating a specific configuration of polarizing plate included in a CF substrate according to an exemplary embodiment.

FIG. 6 is a plan view illustrating a specific configuration of polarizing plate 207. Polarizing plate 207 includes first side (edge) 207a, second side 207b, third side 207c, and fourth side 207d. First side 207a and second side 207b extend in the column direction, and are disposed opposite to each other in the row direction. Third side 207c and fourth side 207d extend in the row direction, and are disposed opposite to each other in the column direction. Third side 207c is connected to one end of each of first side 207a and second side 207b, and fourth side 207d is connected to the other end of each of first side 207a and second side 207b. Notch 208 is formed in a side (in this case, first side 207a) near a driver (in this case, source driver IC 20 and gate driver IC 30) in the sides (edges) of polarizing plate 207. For example, notch 208 is formed into a U-shape. Notch 208 is formed in the vicinity of the center of first side 207a in the column direction. More specifically, in first side 207a, notch 208 is formed in a region closer to central position MO between ends E1, E2 than to ends E1, E2 connected to third side 207c or fourth side 207d. Length in the row and column directions of notch 208 is set to an extent in which conductive layer 206 (see FIG. 1) disposed below polarizing plate 207 can be exposed, and an extent in which connection member 400 (see FIG. 1) can be disposed in the exposed portion of conductive layer 206.

Figure 7:
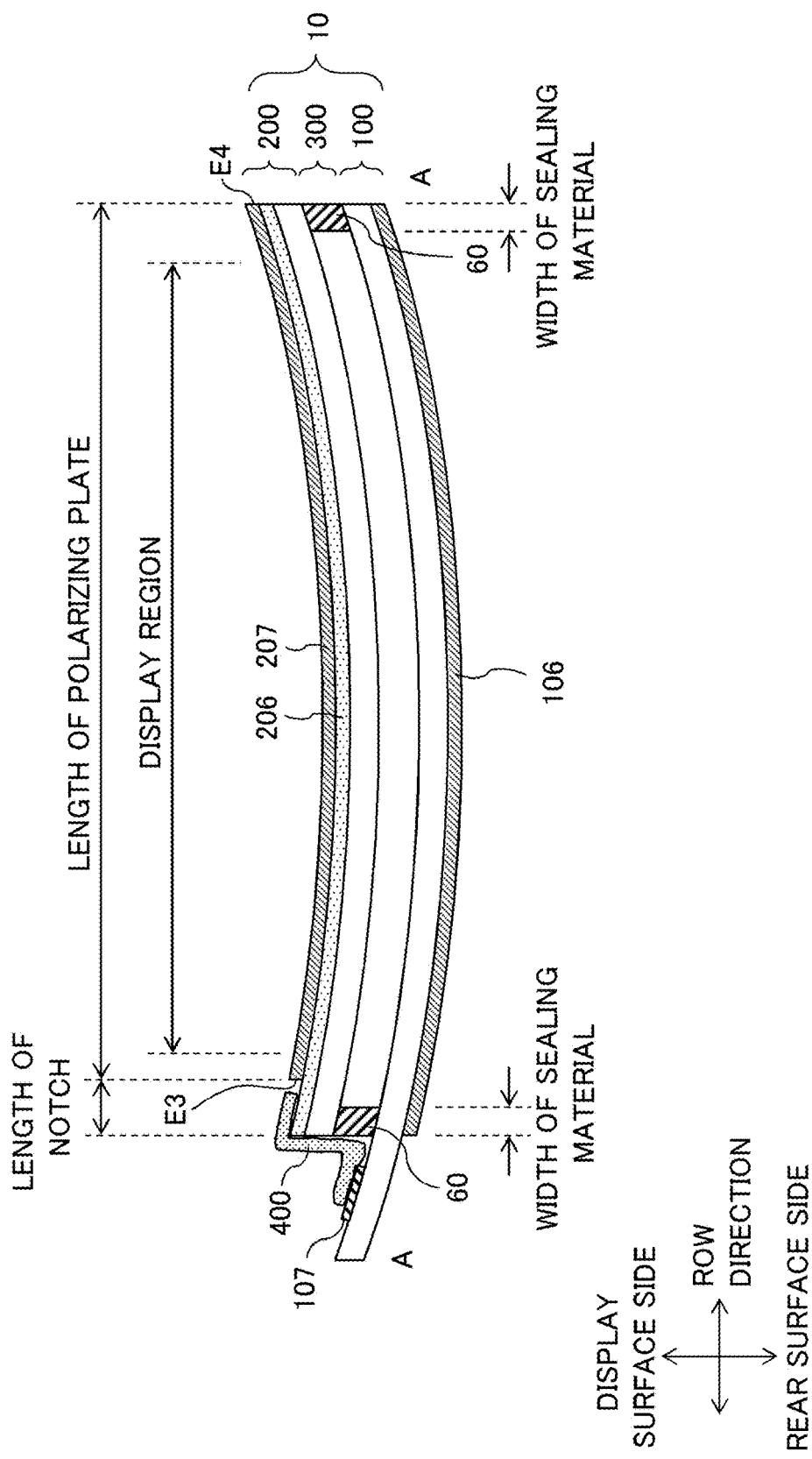
FIG. 7 is a sectional view taken along line A-A in FIG. 1.

FIG. 7 is a sectional view taken along line A-A' in FIG. 1. As illustrated in FIG. 7, in the portion in which notch 208 is formed, a length in the row direction of polarizing plate 207 is larger than a length in the row direction of display region 10a. In planar view, an end portion (left end portion E3 in FIG. 7) of polarizing plate 207 in the portion in which notch 208 is formed is located outside display region 10a and inside the inner periphery of sealing material 60. However, the present disclosure is not limited to such an example. Alternatively, the end portion (left end portion E3 in FIG. 7) of polarizing plate 207 in the portion in which notch 208 is formed may be located outside the inner periphery of sealing material 60 in planar view. In planar view, an end portion (right end portion E4 in FIG. 7) (second side 207b) of polarizing plate 207 on the opposite side to the portion in which notch 208 is formed is located outside display region 10a, and coincides with the outer periphery of sealing material 60.

Figure 8:
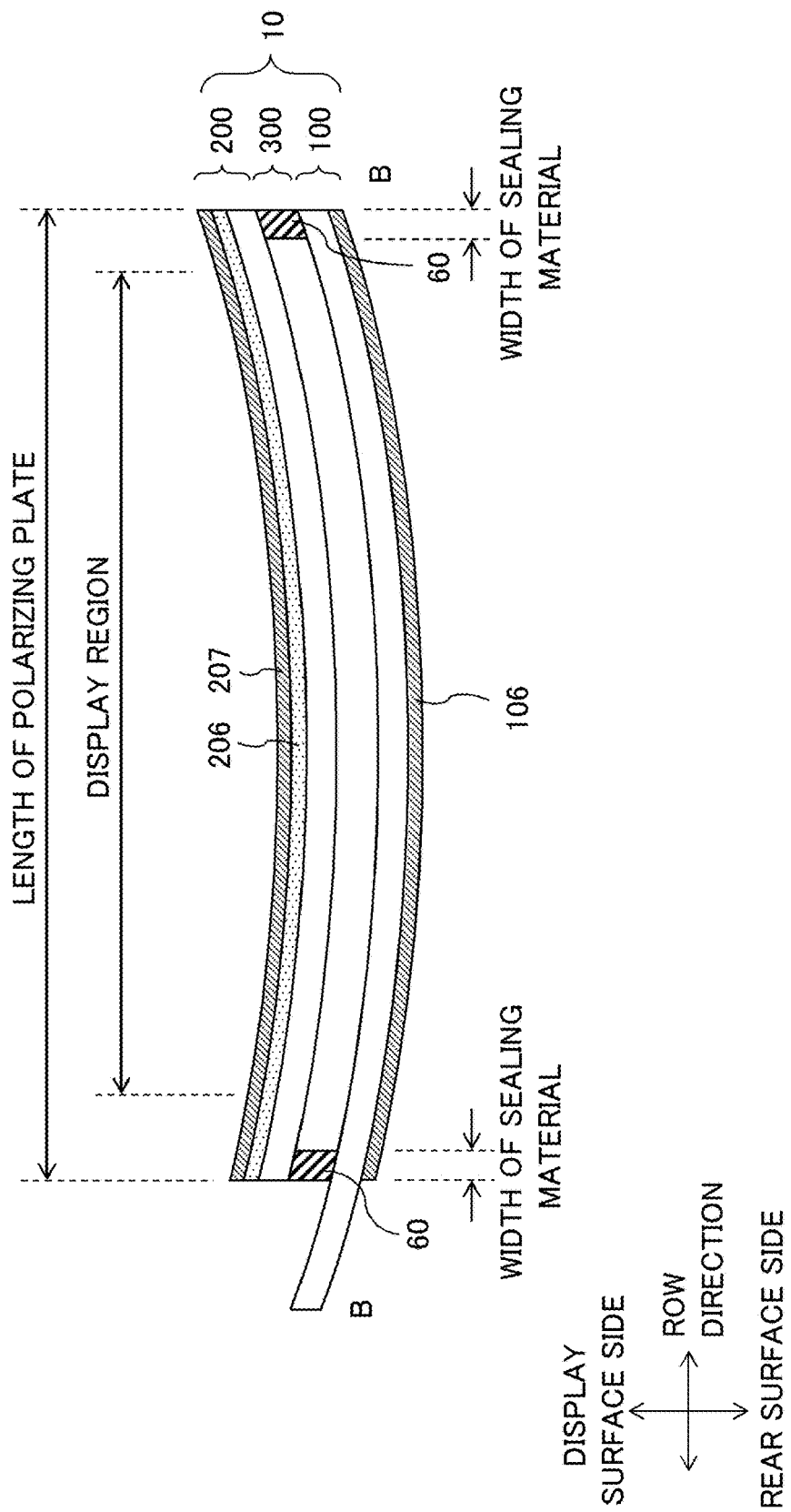
FIG. 8 is a sectional view taken along line B-B in FIG. 1.

FIG. 8 is a sectional view taken on line B-B' in FIG. 1. As illustrated in FIG. 8, the length in the row direction of polarizing plate 207 is larger than a length in the row direction of display region 10a. In planar view, the end portions (right and left end portions in FIG. 8) (first side 207a and second side 207b) of polarizing plate 207 in a portion in which notch 208 is not formed are located outside display region 10a, and coincides with the outer periphery of sealing material 60. In planar view, third side 207c and fourth side 207d of polarizing plate 207 are located outside display region 10a, and coincides with the outer periphery of sealing material 60. Thus, in polarizing plate 207, the peripheral portion in which notch 208 is not formed is disposed so as to overlap sealing material 60 in planar view. The portion of polarizing plate 207 where notch 208 is formed may overlap sealing material 60.

At this point, in the conventional configuration, in order to ensure a region where the conductive layer and the ground terminal are connected to each other, a side closer to the driver in the polarizing plate provided in the CF substrate tends to be disposed at a position near the display region compared with a side farther away from the driver. On the other hand, because the vicinity of the end portion near the driver is hardly held in the CF substrate, the distortion is more easily generated in the vicinity of the corner near the driver in the display panel, and the luminance unevenness becomes conspicuous in the vicinity of the corner near the driver in the display screen. On the other hand, liquid crystal display device 1 according to the exemplary embodiment has the configuration in which, in polarizing plate 207, at least a part (the portion in which notch 208 is not formed) of the side (first side 207a) near the driver is disposed not inside sealing material 60, but to overlap sealing material 60 in planar view. Therefore, the distortion is reduced at least in the vicinity of the corner near the driver in display panel 10, so that the luminance unevenness occurring in the vicinity of the corner in the display screen can be reduced compared with the conventional configuration. As described above, in polarizing plate 207 of liquid crystal display device 1, in addition to a part of first side 207a near the driver, preferably, second side 207b, third side 207c, and fourth side 207d are disposed so as to overlap sealing material 60 in planar view. Therefore, the distortion is reduced in the vicinity of each corner in display panel 10, so that the luminance unevenness occurring in the vicinity of each corner in the display screen can be reduced.

Figure 9:
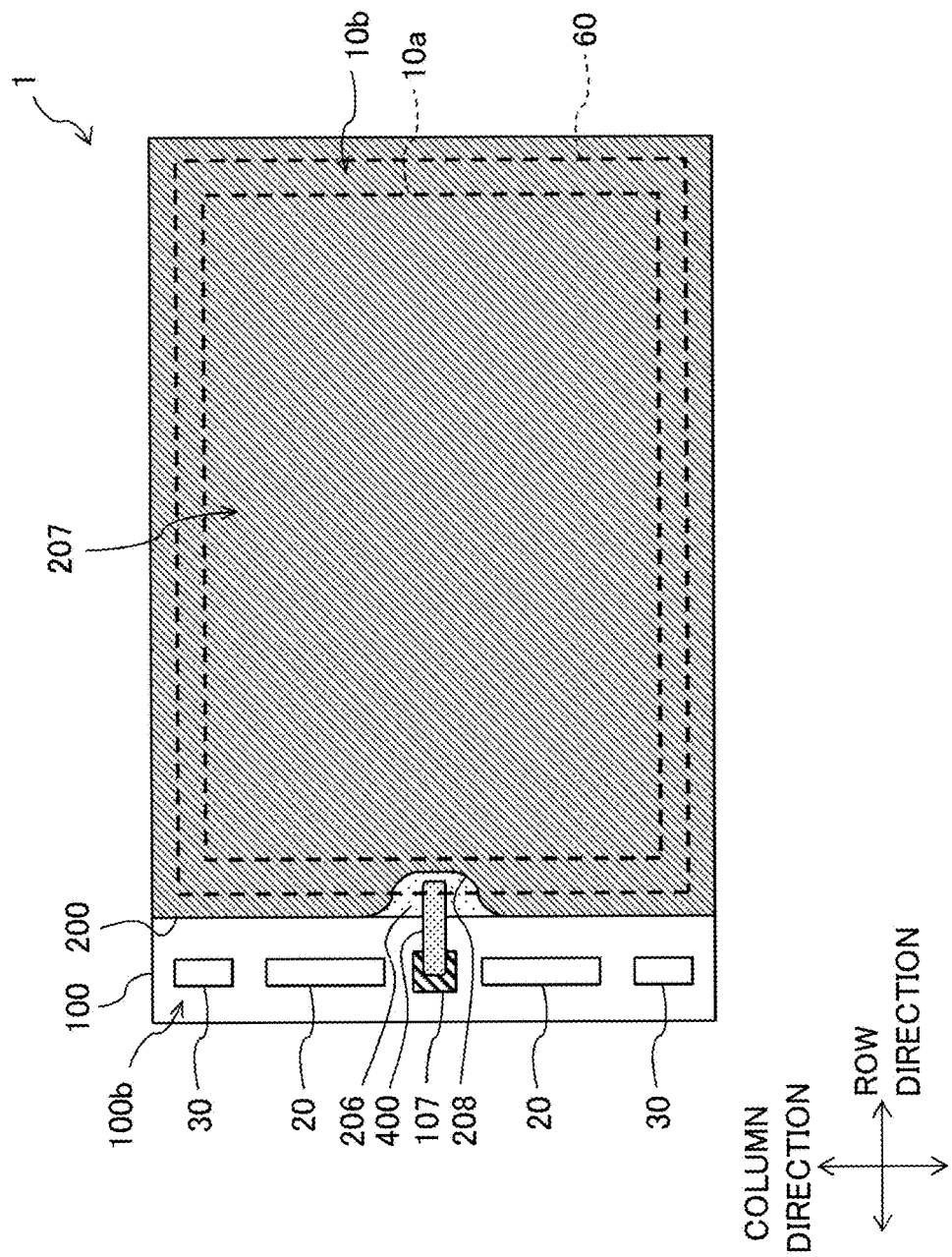
FIG. 9 is a plan view illustrating another configuration of polarizing plate included in a CF substrate according to an exemplary embodiment.
Figure 10:
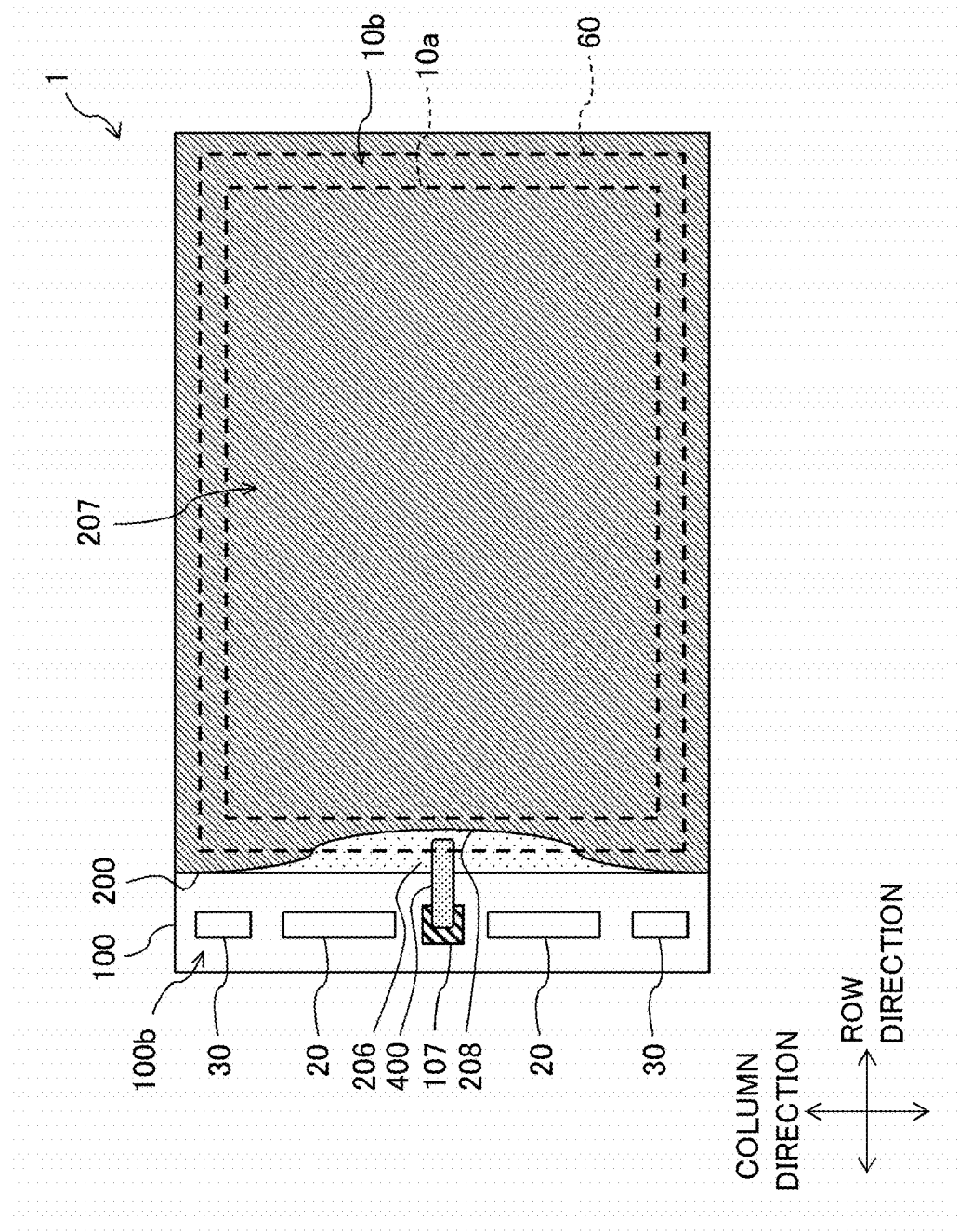
FIG. 10 is a plan view illustrating another configuration of polarizing plate included in a CF substrate according to an exemplary embodiment.

In polarizing plate 207 of FIGS. 1 and 6, notch 208 is formed into the U-shape. However, the shape of notch 208 is not limited to the U-shape. For example, as illustrated in FIG. 9, the corner of notch 208 in FIG. 6 may be formed into an arc shape. In the configuration of FIG. 9, the stress is hardly concentrated on the corner of notch 208 when polarizing plate 207 is curved, so that deformation or damage can be reduced around notch 208. Therefore, the luminance unevenness occurring around notch 208 can be reduced. The corner of notch 208 may be formed into a polygonal shape. There is no limitation to a size of the arc portion of notch 208 in FIG. 9. For example, the arc portion of notch 208 may be formed so as to increase in the column direction as illustrated in FIG. 10.

In the exemplary embodiment, TFT substrate 100 as the first substrate includes driver mounting region 100b protruding in the first direction (row direction) from CF substrate 200 as the second substrate in planar view, and the driver (source driver IC 20 and gate driver IC 30) is mounted on driver mounting region 100b. According to the exemplary embodiment, the driver is disposed in driver mounting region 100b that is hardly influenced by the deformation of the bending, so that a risk of disconnecting the wiring connected to the driver can be reduced while the driver is stably mounted.

In the exemplary embodiment, in first side 207a, notch 208 is formed in a region closer to central position MO between ends E1, E2 than to ends E1, E2 connected to third side 207c or fourth side 207d. In this case, notch 208 can be disposed in a region other than the corner of the display screen, the luminance unevenness occurring in the vicinity of the corner is hardly worsened by the formation of notch 208.

Figure 11:
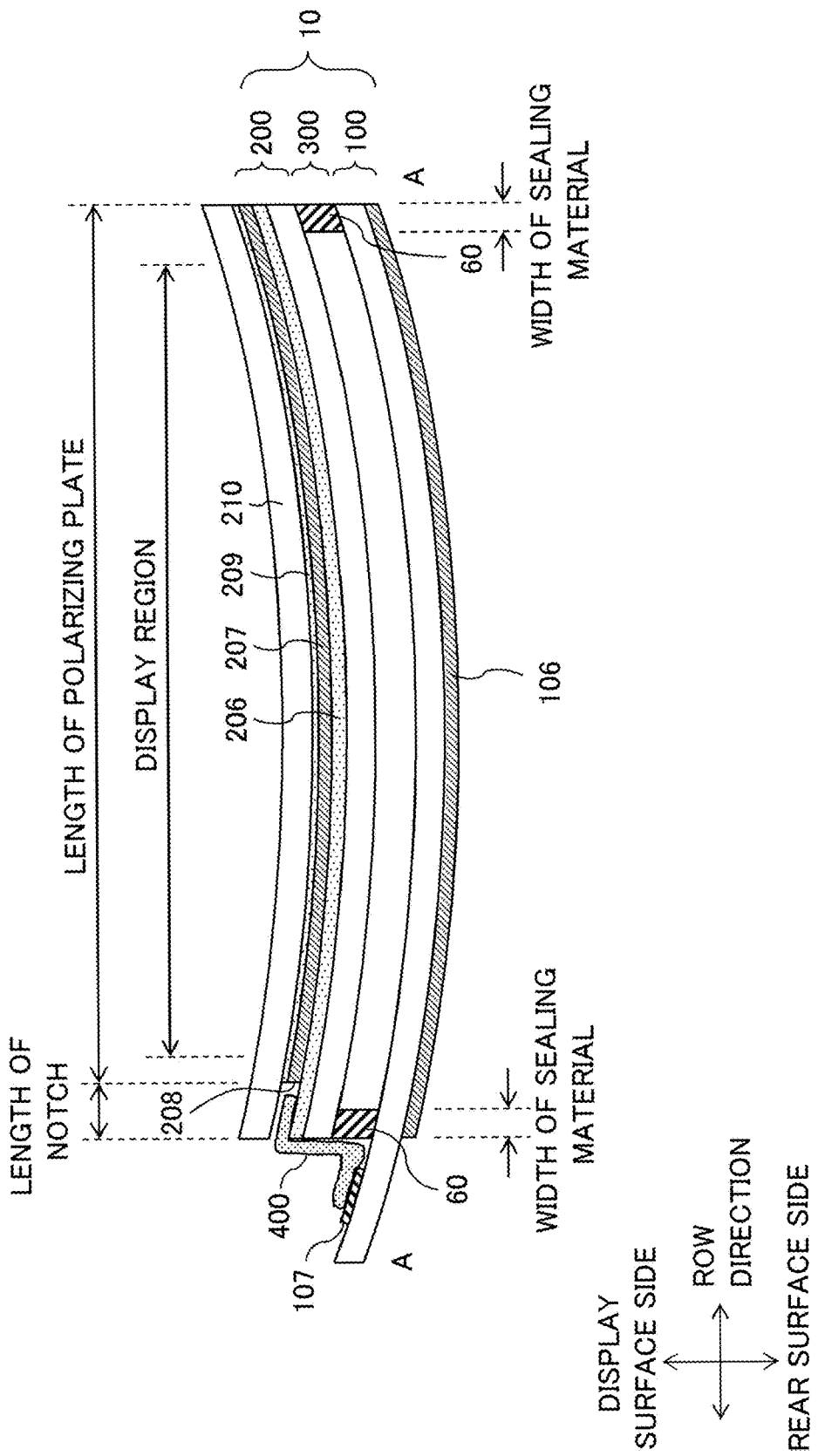
FIG. 11 is a sectional view taken along line A-A, illustrating another configuration of the liquid crystal display device according to an exemplary embodiment.
Figure 12:
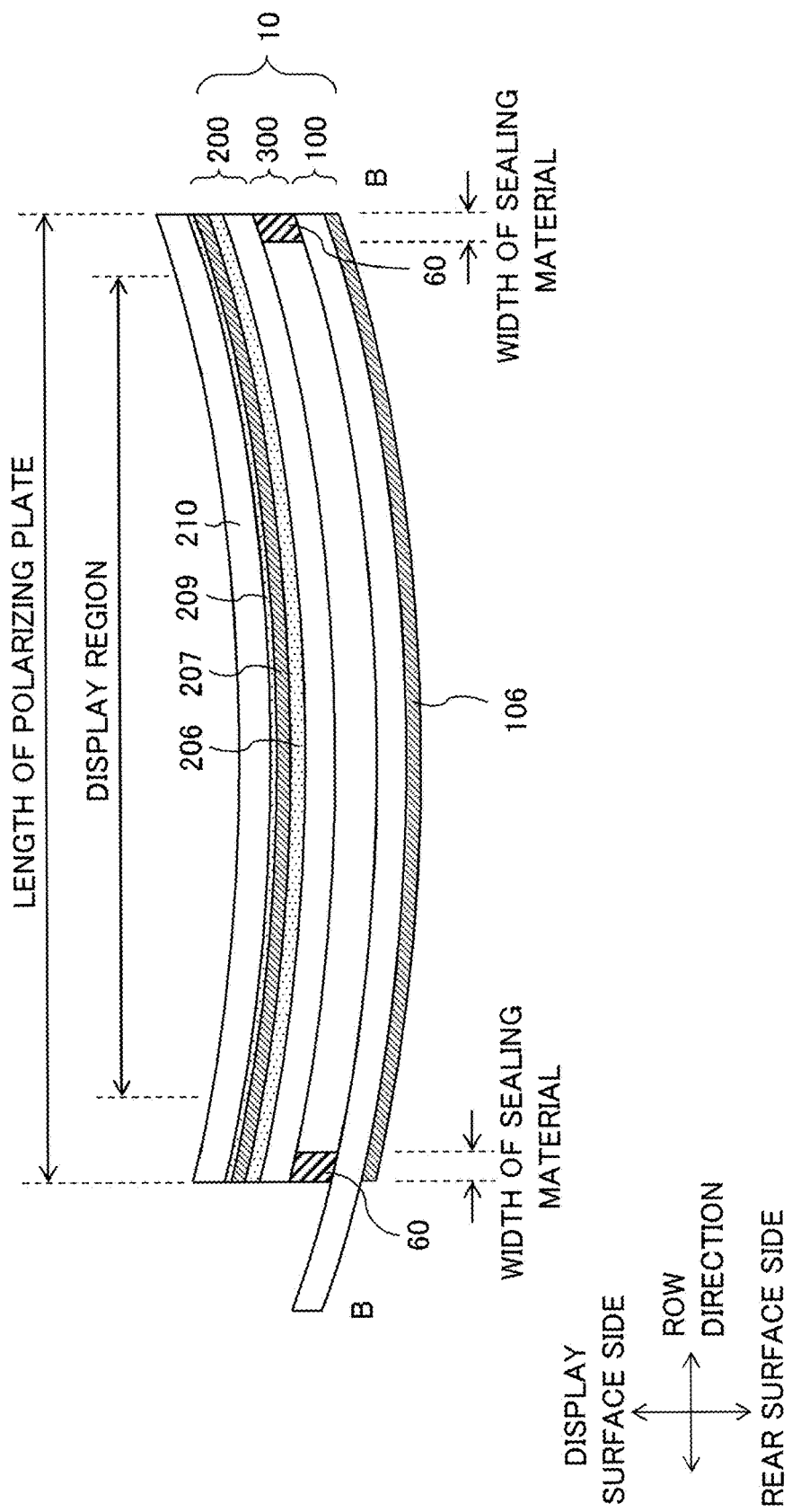
FIG. 12 is a sectional view taken along line B-B, illustrating another configuration of the liquid crystal display device according to an exemplary embodiment.

Liquid crystal display device 1 according to the present disclosure is not limited to the above configuration. For example, as illustrated in FIGS. 11 and 12, cover glass 210 as the front plate may be provided on the display surface side in liquid crystal display device 1. FIG. 11 illustrates a cross-section identical to that taken along line A-A' in FIG. 1, and FIG. 12 illustrates a cross-section identical to that taken along line B-B' in FIG. 1. Cover glass 210 is formed into the curved shape, and bonded to CF substrate 200 by adhesive layer 209. For example, adhesive layer 209 is made of an ultraviolet curable resin (OCR). Specifically, adhesive layer 209 that is formed so as to cover whole polarizing plate 207 is disposed on polarizing plate 207, and cover glass 210 that is formed so as to cover whole polarizing plate 207 is disposed on adhesive layer 209. As illustrated in FIG. 11, adhesive layer 209 is applied so as not to be disposed on notch 208. However, there is no problem even if adhesive layer 209 is applied onto notch 208. When adhesive layer 209 is irradiated with ultraviolet light, cover glass 210 is fixedly bonded to polarizing plate 207. Therefore, curved display panel 10 is held by cover glass 210. In the configuration of FIG. 11, polarizing plate 207 is disposed up to the peripheral portion of CF substrate 200, and cover glass 210 is disposed so as to cover the peripheral portion of polarizing plate 207, so that the peripheral portion of display panel 10 can also be held by cover glass 210. Therefore, distortion is reduced in the vicinity of the corner in display panel 10, so that the luminance unevenness occurring in the vicinity of the corner in the display screen can be reduced. In liquid crystal display device 1, for example, a heat shrinkable film having a property of shrinking in one axial direction by heating may be used instead of adhesive layer 209 and cover glass 210.

Figure 13:
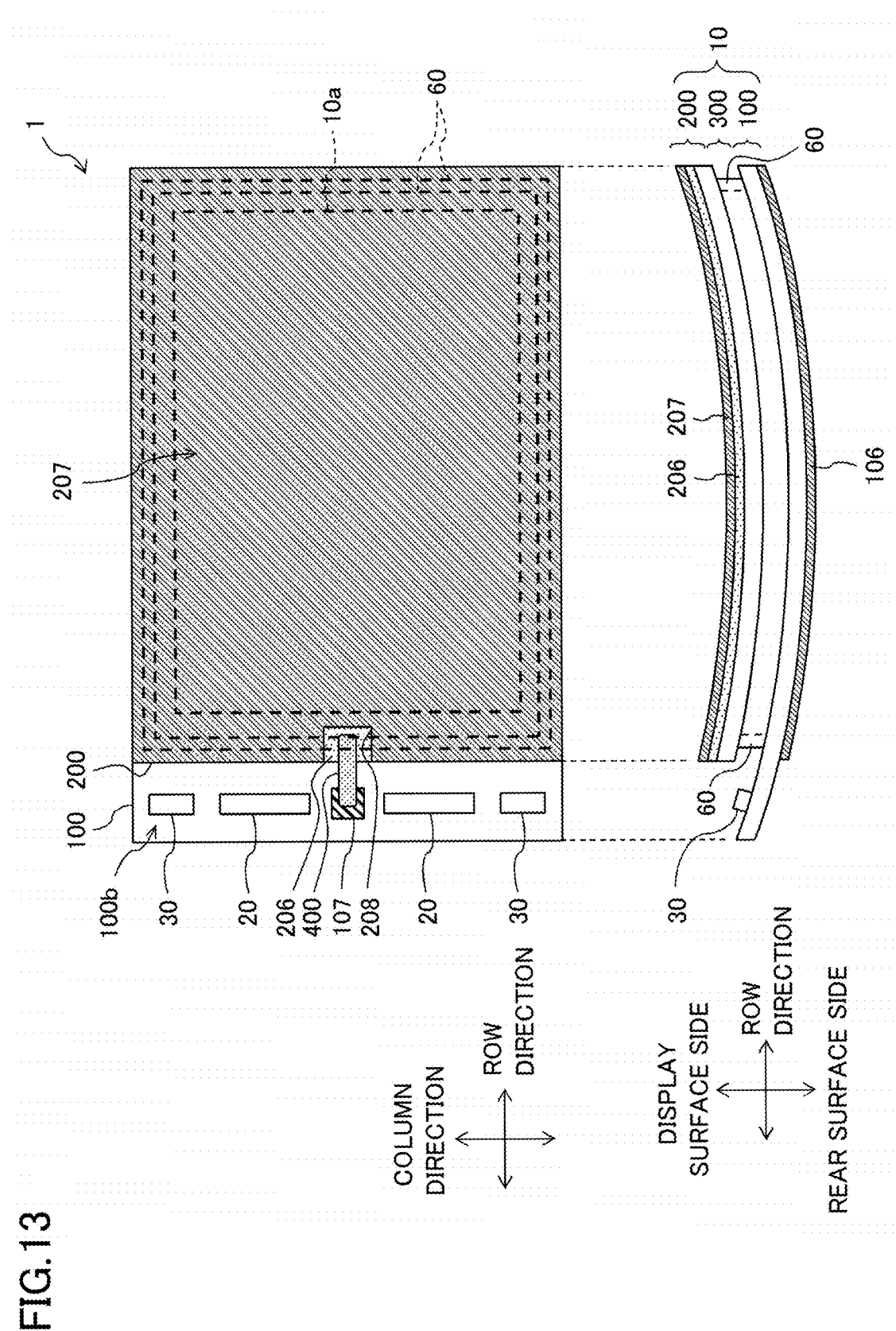
FIG. 13 is a plan view and a side view illustrating another configuration of a liquid crystal display device according to an exemplary embodiment.

In the above configuration, sealing material 60 is disposed such that the outer periphery of sealing material 60 coincides with the peripheral portion of CF substrate 200 in planar view. Alternatively, as illustrated in FIG. 13, in the liquid crystal display device according to the present disclosure, sealing material 60 may be disposed such that the outer periphery of sealing material 60 is located inside the peripheral portion of CF substrate 200. In the configuration of FIG. 13, polarizing plate 207 is disposed such that the portion in which notch 208 is not formed in the peripheral portion of polarizing plate 207 is located outside sealing material 60 (beyond sealing material 60) in planar view. In the configuration of FIG. 13, in polarizing plate 207, at least a portion near the driver needs to be located outside sealing material 60.

In the above configuration, both source driver IC 20 and gate driver IC 30 are disposed in one side surface (in FIG. 1, the left side surface). However, the liquid crystal display device according to the present disclosure is not limited thereto. Alternatively, for example, source driver IC 20 may be disposed in the left side surface while gate driver IC 30 is disposed in the upper side surface. In this case, ground terminal 107 and notch 208 of polarizing plate 207 may be disposed on the left side surface or the upper side surface, or ground terminal 107 and notch 208 may be disposed on both the left side surface and the upper side surface.

Liquid crystal display device 1 having the above configuration is bent so as to be curved in the row direction (see FIG. 1). Alternatively, the liquid crystal display device according to the present disclosure may be bent so as to be curved in the column direction, and there is no limitation to the bending direction. Liquid crystal display device 1 having the above configuration is bent such that the rear surface side becomes convex (see FIG. 1). Alternatively, the liquid crystal display device according to the present disclosure may be bent such that the display surface side becomes convex, and there is no limitation to the convex direction.

In the above, the specific embodiments of the present application have been described, but the present application is not limited to the above-mentioned embodiments, and various modifications may be made as appropriate without departing from the spirit of the present application.

What is claimed is:

1. A liquid crystal display device being a lateral electric field type having a curved display surface, the liquid crystal display device comprising:
    a first substrate including a plurality of gate lines, a plurality of data lines, a pixel electrode, a common electrode, and a driver mounting region;
    a second substrate opposite to the first substrate, the second substrate including a polarizing plate a conductive layer;
    a liquid crystal layer between the first substrate and the second substrate;
    a sealing material surrounding the liquid crystal layer and used to bond the first substrate and the second substrate together;
    a driver that outputs a drive signal to at least the plurality of gate lines or the plurality of data lines; and
    a connection member,
    wherein in the polarizing plate, at least a part of a side near the driver overlaps the sealing material or is outside the sealing material in planar view,
    the first substrate is curved such that a portion of the first substrate located at a center in a first direction protrudes from portions of the first substrate located at both ends in the first direction toward a display surface side or a rear surface side, and the driver mounting region protrudes in the first direction from the second substrate in planar view,
    the second substrate is curved along the first substrate and the conductive layer is in a position closer to the first substrate than the polarizing plate,
    the driver is mounted in the driver mounting region,
    a ground terminal is in the driver mounting region,
    the connection member electrically connects the ground terminal to the conductive layer,
    the side near the driver in the polarizing plate includes a notch, such that a connection region to the connection member in the conductive layer is exposed, and
    at least a part of the notch overlaps the sealing material in planar view.

2. The liquid crystal display device according to claim 1, wherein in planar view, one end of the connection member overlaps the ground terminal, and another end of the connection member overlaps the connection region exposed from the notch in the polarizing plate.

3. The liquid crystal display device according to claim 1, wherein
    the polarizing plate includes a first side which is provided with the notch and located near the driver, a second side located opposite to the first side, a third side connected to one end of the first side and one end of the second side, a fourth side connected to another end of the first side and another end of the second side, and in planar view, a portion connected to the notch in the first side, the second side, the third side, and the fourth side overlaps the sealing material, or is located outside the sealing material.

4. The liquid crystal display device according to claim 3, wherein in the first side, the notch is in a region closer to a central position between the one end of the first side connected to the third side and the another end of the first side connected to the fourth side than to the one end of the first side connected to the third side and the another end of the first side connected to the fourth side.

5. The liquid crystal display device according to claim 1, wherein a corner of the notch is an arc shape.

6. The liquid crystal display device according to claim 1, further comprising a front plate on a display surface side of the second substrate,
   wherein the front plate is fixedly bonded to the polarizing plate with an adhesive layer interposed therebetween, and
   the front plate and the adhesive layer cover a whole of the polarizing plate in planar view.

7. The liquid crystal display device according to claim 1, wherein a leading end of the notch is inside an inner periphery of the sealing material.

8. The liquid crystal display device according to claim 7, wherein the leading end of the notch is outside a display region.

* * * * *